United States Patent [19]

Brandle, Jr. et al.

[11] Patent Number: 4,981,341

[45] Date of Patent: Jan. 1, 1991

[54] APPARATUS COMPRISING A MAGNETO-OPTIC ISOLATOR UTILIZING A GARNET LAYER

[75] Inventors: Charles D. Brandle, Jr., Basking Ridge; Vincent J. Fratello, New Providence; Steven J. Licht, Bridgewater, all of N.J.

[73] Assignee: AT&T Bell Laboratories, Murray Hill, N.J.

[21] Appl. No.: 380,579

[22] Filed: Jul. 14, 1989

[51] Int. Cl.$^5$ .............................................. G02F 1/09
[52] U.S. Cl. .................................... 350/377; 350/387; 350/390
[58] Field of Search ............... 350/375, 376, 377, 378, 350/96.13, 384, 384, 387, 390; 252/583, 585

[56] References Cited

U.S. PATENT DOCUMENTS

| | | | |
|---|---|---|---|
| 3,680,065 | 7/1972 | Almasi et al. | 350/377 |
| 3,764,195 | 10/1973 | Blank et al. | 350/377 |
| 3,784,281 | 1/1974 | Kuse | 350/377 |
| 3,811,096 | 5/1974 | Dillon, Jr. et al. | 350/378 |
| 4,449,096 | 5/1984 | Doriath et al. | 350/377 |
| 4,522,473 | 6/1985 | Hibiya et al. | 350/377 |

OTHER PUBLICATIONS

"Temperature Stabilized and Wideband Optical Isolator with 60 dB Isolation Loss", by S. Takeda et al., *Conference on Lasers and Electro-Optics*, Anaheim, Calif., Apr. 25–29, 1988, paper W4-02.

"Temperature-Compensated Faraday Rotator for Optical Isolator", by K. Machida et al., *Optoelectronics—Devices and Technologies*, vol. 3, No. 1, pp. 99–105, Jun. 1988.

"Improvement of Temperature Dependence of Faraday Rotation Using Two Layer Epitaxial Films in (BiR)IG for Optical Isolators", by H. Minemoto, *Advances in Magneto-Optics, Proc. Int. Symp. Magneto-Optics J. Magn. Soc. Jpn.*, vol. 11, Supplement No. S1, (1987), 357–360.

"Temperature Dependence of Faraday Rotation in Bi-Substituted Terbium Iron Garnet Films", by H. Umezawa, *J. Appl. Phys.*, vol. 63 (8), 15 Apr. 1988.

"Rare-Earth, Gadolinium", Handbook of Microwave Ferrite Materials, edited by W. H. Von Aulock, Bell Telephone Labs., Whippany, N.J., 1965, Academic Press, New York and London, pp. 167–194.

"Temperature-Stabilized Optical Isolator for Collimated Light Using $(BiLuGd)_3Fe_5O_{12}/(BiGd)_3(FeGa)_5O_{12}$ Composite Film", by K. Matsuda, *Applied Optics*, vol. 27, No. 7, Apr. 1, 1988, pp. 1329–1333.

Primary Examiner—Bruce Y. Arnold
Assistant Examiner—Martin Lerner
Attorney, Agent, or Firm—E. E. Pacher

[57] ABSTRACT

Apparatus according to the invention comprises magneto-optic isolator means that utilize a novel temperature compensation scheme. The scheme involves the use of a composite magneto-optic member that comprises a first single crystal garnet layer that does not have a compensation temperature within the operating temperature range of the isolator, and further comprises a single crystal garnet layer (the "compensation point layer") that has a compensation temperature within the operating temperature range of the isolator. Exemplarily, the compensation point layer has composition $(Bi_{0.8}Tb_{1.1}Gd_{1.1})(Fe_{4.6}Ga_{0.4})O_{12}$, and is grown on an CMZ:GGG substrate, and the first garnet layer has composition $(Bi_{1.2}Tb_{1.8})(Fe_{4.6}Ga_{0.4})O_{12}$ and is grown on the compensation point layer. The novel temperature compensation scheme can result in isolators having improved extinction ratio with relatively small additional path length in the magneto-optic material.

11 Claims, 5 Drawing Sheets

APPARATUS COMPRISING A MAGNETO-OPTIC ISOLATOR UTILIZING A GARNET LAYER

FIELD OF THE INVENTION

This invention pertains to apparatus that comprises a magneto-optic isolator, and in particular an isolator that comprises a magneto-optic garnet film.

BACKGROUND OF THE INVENTION

In many applications of lasers or other radiation sources it is important to prevent reflected radiation from interacting with the source, since such interaction can, for instance, generate noise and unwanted feedback. An example of an application in which there frequently is need to isolate a source from reflected radiation is lightwave communications, especially high bit rate communications over relatively long distances.

It has long been known that the Faraday effect in magneto-optic materials can be used to provide a non-reciprocal device that can serve as an isolator, i.e., a device which can permit light passage in only one direction. Yttrium iron garnet (YIG) is a magneto-optic material that has been used for isolator applications. However, YIG has recently become quite expensive. Furthermore, it has only a relatively small specific rotation in the near infrared wavelength regime of interest for lightwave communications (e.g., 0.8–1.6 μm), such that a large path length (about 2.7 mm at $\lambda = 1.31$ μm) is required to provide the 45° rotation necessary for an isolator. It also has a relatively high saturation magnetization, which typically requires the use of a large, high field magnet (e.g., SmCo) that typically is not only expensive but also may affect, and/or be affected by, nearby components.

It is known that Bi substitution in rare earth iron garnets can greatly increase the specific Faraday rotation of these materials. It is also known that the specific Faraday rotation of garnets of interest herein typically is a function of temperature, decreasing with increasing temperature.

A magneto-optic isolator typically comprises first and second polarizing means, a magneto-optic member between the polarizing means, and magnet means adapted for causing magnetic saturation of the relevant part of the magneto-optic member. Radiation from a radiation source (e.g., a semiconductor laser or a LED) is linearly polarized by the first polarizing means, the plane of polarization is rotated by an angle of $45° \pm \theta$ by the magneto-optic member, and only radiation polarized parallel to the direction of polarization of the second polarizing means passes through the second polarizing means and is available to be utilized by appropriate utilization means. Typically the polarization direction of the second polarizing means is set 45° from the direction of polarization of the first polarizing means, such that, for $\theta = 0$, essentially all radiation that has been passed by the first polarizing means is also passed by the second.

Radiation reflected back towards the isolator encounters first the second ("exit") polarizing means, which will pass only the component parallel to its direction of polarization. This radiation will be rotated by $45° \pm \theta$ by the magneto-optic means, and thus be oriented $90° \pm \theta$ to the polarization direction of the first ("entrance") polarizing means, which will pass only the electric field component proportional to $\sin \theta$. The back reflected radiation intensity passed by such an isolator will therefore be proportional to $\sin^2 \theta$. For $\theta = 0$, the isolator blocks all reflected radiation. However, the specific rotation of the garnet materials of interest herein being temperature dependent, $\theta$ typically is zero only at one particular temperature within the operating temperature range of the isolator.

The ability of an isolator to block reflected radiation is frequently expressed in terms of the "extinction ratio" (ER), where ER (in db) $= -10 \log (P_2/P_o)$. $P_o$ is the incoming intensity parallel to the second polarizing means and $P_2$ is the outgoing intensity from the first polarizing means towards the radiation source. Assuming ideal polarizing means, $ER = -10 \log (\sin^2 \theta)$, which is shown in FIG. 1. Clearly, ER is a sensitive function of $\theta$, which in turn is a function of the temperature.

In many important applications of optical isolators ER may not be less than a specified value over a relatively wide temperature range (e.g., 0°–85° C. in exemplary optical fiber communication apparatus). Thus, the temperature dependence of the specific rotation of magneto-optically active garnet materials is a significant drawback.

Workers in this field have proposed several approaches to reducing this drawback. However, the prior art approaches have not proven fully satisfactory. For instance, it has been proposed to use two serially connected conventional isolators that have slightly different characteristics (S. Takeda et al., *Conference on Lasers and Electro-Optics*, Anaheim, Calif., Apr. 25–29, 1988, paper W4-02). This approach is costly and results in a relatively complex and large isolator package. It has also been proposed to use a composite structure comprising two types of Bi-substituted rare earth iron garnet thick films which have opposite Faraday rotations, such that the resulting rotation, the sum of the two contributions, is relatively temperature independent. (See K. Machida et al., Optoelectronics-Devices and Technologies, Vol. 3(1), pp. 99–105; H. Minemoto et al., *Proceedings of the International Symposium on Magneto-Optics; Journal of the Magnetics Society of Japan*, Vol. 11, Suppl. S1, pp. 357–360; K. Matsuda et al, *Applied Optics*, Vol. 27(7), pp. 1329–1333). This approach requires the use of two relatively thick garnet films of precisely controlled composition and thickness. Production of these films is difficult. Furthermore, such an isolator can be expected to have relatively high insertion loss, due to the relatively long pathlength in garnet films.

In view of the technological importance of magneto-optic isolators, it would be highly desirable to have available a technique for temperature compensating such an isolator that is not subject to the shortcomings of prior art techniques. In particular, it would be desirable to have available magneto-optic members that can be produced relatively simply and inexpensively, that can result in isolators having relatively short pathlength in the garnet material, and that have a relatively large ER over a relatively large temperature range. This application discloses apparatus comprising such members.

DEFINITION

The "compensation point temperature" $T_{comp}$ of a garnet material is that temperature at which the net magnetization of the material crosses through zero. Typically, the specific Faraday rotation of the material does not have a zero crossing at $T_{comp}$, but undergoes a sign change at that temperature, typically resulting in a "step function" that, exemplarily, is positive at temperatures just below $T_{comp}$ and negative just above, with a finite magnitude "jump" at $T_{comp}$. See, for instance, H. Umezawa, *Journal of Applied Physics*, Vol. 63(8), pp. 3113-3115, especially FIG. 3.

SUMMARY OF THE INVENTION

Disclosed are temperature compensated magneto-optic isolator means, wherein the temperature compensation is achieved by a novel principle, the use of a compensation point layer or layers. Use of the novel principle can overcome the shortcomings associated with prior art temperature compensation techniques.

In one aspect the invention is apparatus that comprises a source of electromagnetic radiation (exemplarily a semiconductor radiation source such as a laser diode or LED), radiation utilization means (exemplarily optical fiber), and magneto-optic isolator means between the source and the utilization means. The isolator means comprise polarizing means, magnet means and a magneto-optic member.

The magnetic-optic member comprises at least a first layer and a second layer, the latter to be referred to as the "compensation point" layer, with the second layer differing in composition from the first. In a currently preferred embodiment the at least two layers are not only epitaxial with each other but also with a substrate.

The composition of the first layer is selected such that the material does not have a compensation temperature $T_{comp}$ within the operating temperature range of the magneto-optic isolator means. Although in currently preferred embodiments the first layer material has $T_{comp}$ lower than any temperature in the operating temperature range, this is not a requirement, and it is possible to have $T_{comp}$ higher than the operating range, or even to use a first layer material that does not have a compensation point. Exemplarily, YIG is such a material.

The composition of the compensation point layer is selected such that the material has a compensation point temperature $T'_{comp}$ that is within the operating temperature range of the isolator means. $T'_{comp}$ is selected such that the minimum value of the ER of the isolator means is larger than that of comparison isolator means that do not comprise a compensation point layer but are otherwise the same as the inventive isolator means. "The same" is intended not to exclude a minor difference in the thicknesses of the first layer or layers (or any other magneto-optically active layers) in the two devices required to achieve $\theta = 0$ at the identical temperature within the operating temperature range in the two devices.

Isolators according to the invention are not limited to magneto-optic members with one compensation point layer but instead may comprise a plurality of such layers, each having a compensation temperature within the operating temperature range of the isolator (e.g., 0°-85° C.). Advantageously the compositions of the respective compensation point layers are chosen such that the minimum value of the ER is further improved, relative to the comparison isolator means. The limit of this process is a compensation point layer that has a continuously varying composition, with a given portion of the second layer material having a compensation temperature within the operating temperature range of the isolator means.

Compensation point layer material typically has nominal composition $(A_{3-x}B'_x)(Fe_{5-y}C'_y)O_{12}$, wherein A is one or more of Gd, Tb, Dy, Ho, and Er; B' is one or more of Y, Bi, Pb, La, Nd, Sm, Eu, Tm, Yb, Lu, and Ca; and C' is one or more of Ga, Al, Ge, and Si. Preferred A are Gd and Tb, preferred B' is Bi, and preferred C' are Ga and Al. The value of x is in the range 0-2, and that of y in the range 0.1-1. Typically, for any choice of A, B' and C', increasing the value of x requires an increase in y, to keep $T'_{comp}$ within the temperature range of interest. Furthermore, for a given x, the effect is larger if B' is an element having a relatively large magnetic moment (e.g., Gd, Tb) than if B' is an element having a relatively small moment (e.g., Ho, Er). In general, the composition is adjusted such that the Curie temperature of the material is above the operating temperature range, and such that $T'_{comp}$ is within that range. For values of x and/or y outside the above indicated ranges it is typically not possible to meet these criteria.

Exemplary magnetic-optic members according to the invention comprise a single crystal CaMgZr-substituted GdGa-garnet (CMZ-GGG) substrate. Exemplarily, on each side of the substrate are grown about 9 μm of material of nominal composition $(Bi_{0.8}Gd_{1.1}Tb_{1.1})(Fe_{4.6}Ga_{0.4})O_{12}$. This material has $T'_{comp}$ of about 43° C., and the two layers together can rotate the plane of polarization of 1.31 μm radiation about 1.3° at 22° C. On each compensation point layer exemplarily is grown a 180 μm thick layer of first material of nominal composition $(Bi_{1.2}Tb_{1.8})Fe_{4.7}Ga_{0.3}O_{12}$, with $T_{comp}$ of about $-70°$ C.

Although in currently preferred embodiments of the invention the magneto-optic member comprises a wafer-like single crystal garnet substrate (substantially transparent at one or more wavelengths in the approximate range 0.8-1.6 μm) with a composite magneto-optic garnet layer (comprising at least one compensation point layer and at least one layer of first material) on each of the two major surfaces of the substrate, this is not a requirement. For instance, the compensation point layer could be grown on one side of the substrate and the first material layer could be grown on the other, or the two layers could be grown on separate substrates and be sandwiched together, with or without substrates. All possible combinations of first material layers and compensation point layers are contemplated.

BRIEF DESCRIPTION OF THE DRAWINGS

Analogous elements in different figures are designated by the same numerals. The figures are not intended to show true dimensions and/or proportions.

DETAILED DESCRIPTION OF SOME EXEMPLARY PREFERRED EMBODIMENTS

Figure 1:
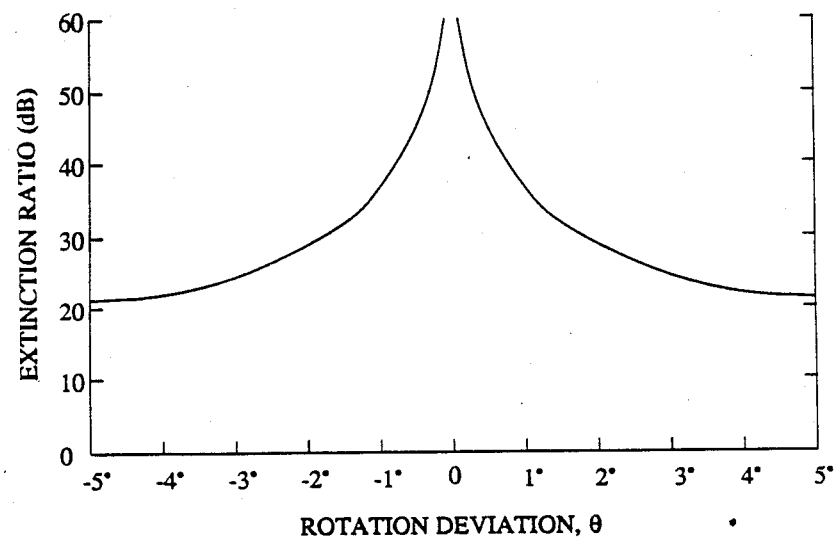
FIG. 1 shows the variation of the extinction ratio of an idealized isolator as a function of $\theta$, the deviation of the Faraday rotation from 45°.

FIG. 1 shows the extinction ratio of an idealized isolator as a function of $\theta$, the Faraday rotation deviation. The temperature derivative of a 45° Faraday isolator using yttrium iron garnet (YIG) is known to be about 0.04°/°C., and that of one using bismuth-substituted rare earth iron garnets exemplarily is in the range 0.06-0.07°/°C. Assuming that an isolator utilizes bismuth-substituted garnet material with a temperature coefficient of 0.06°/°C., that the intended operating temperature range of the isolator is from 0°-85° C., and that the isolator is designed to have $\theta=0$ at 22° C., then the maximum rotation deviation is about 3.78° at 85° C. As FIG. 1 shows, this corresponds to an ER of only about 23 dB. Such a relatively low ER is unacceptable for many applications, requiring temperature compensation.

Figure 2:
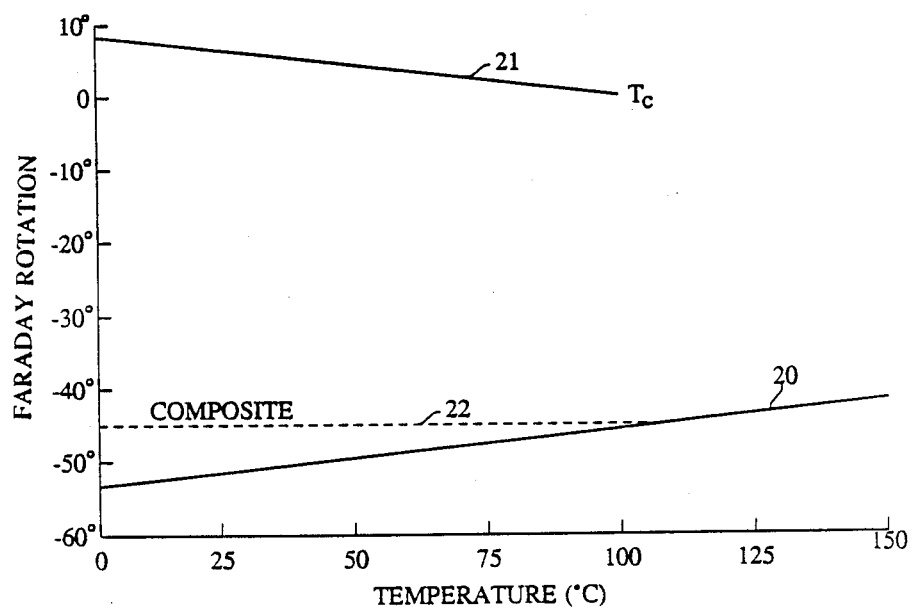
FIG. 2 illustrates temperature compensation by means of a "subtractive" layer, as known to the prior art.

FIG. 2 schematically illustrates a prior art temperature compensation scheme that was discussed above. Curve 20 corresponds to the Faraday rotation of an exemplary Bi-based iron garnet layer with little or no substitution on the iron sublattice. It will be noticed that this material has a negative Faraday rotation. Curve 21 pertains to a different Bi-based iron garnet layer with a high degree of substitution (exemplarily Ga,Al, or both) on the iron sublattice. This material has a positive Faraday rotation that goes to zero at the Curie temperature of the material. By forming a composite member that comprises a predetermined thickness of the first material and a predetermined thickness of the second (substractive) material, it is possible to attain an overall Faraday rotation that is substantially independent of temperature over a significant temperature range, as indicated by the composite curve labeled 22. Above the Curie temperature of the substractive layer the Faraday rotation of the composite member will be the same as that of the first material. Although workable, this approach to temperature compensation has significant disadvantages, as was discussed above.

Figure 3:
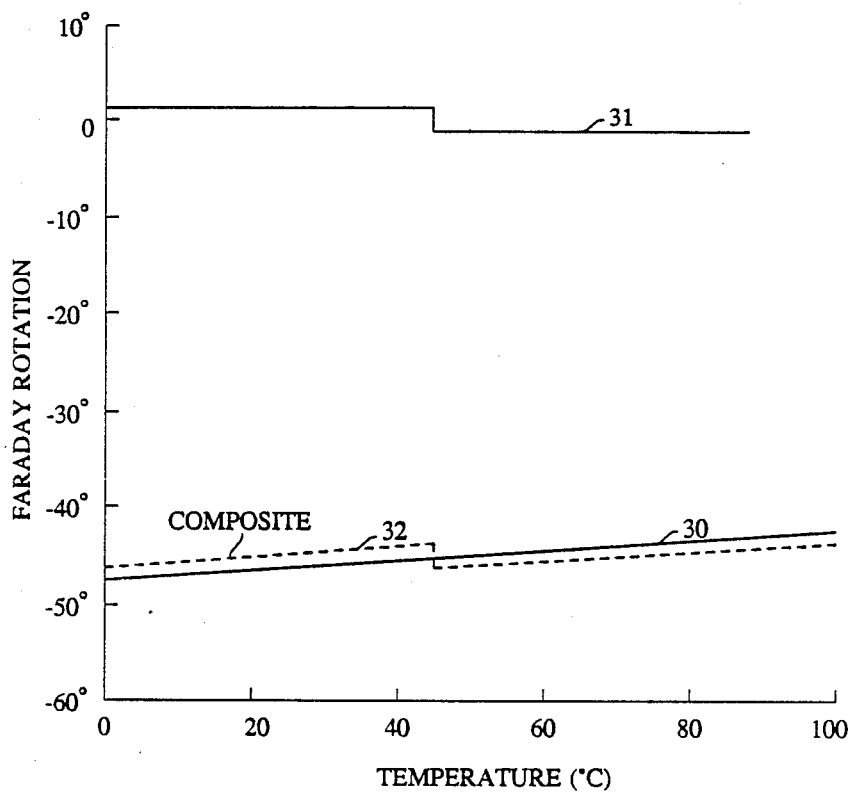
FIG. 3 schematically illustrates temperature compensation by means of a compensation point layer according to the invention.
Figure 4:
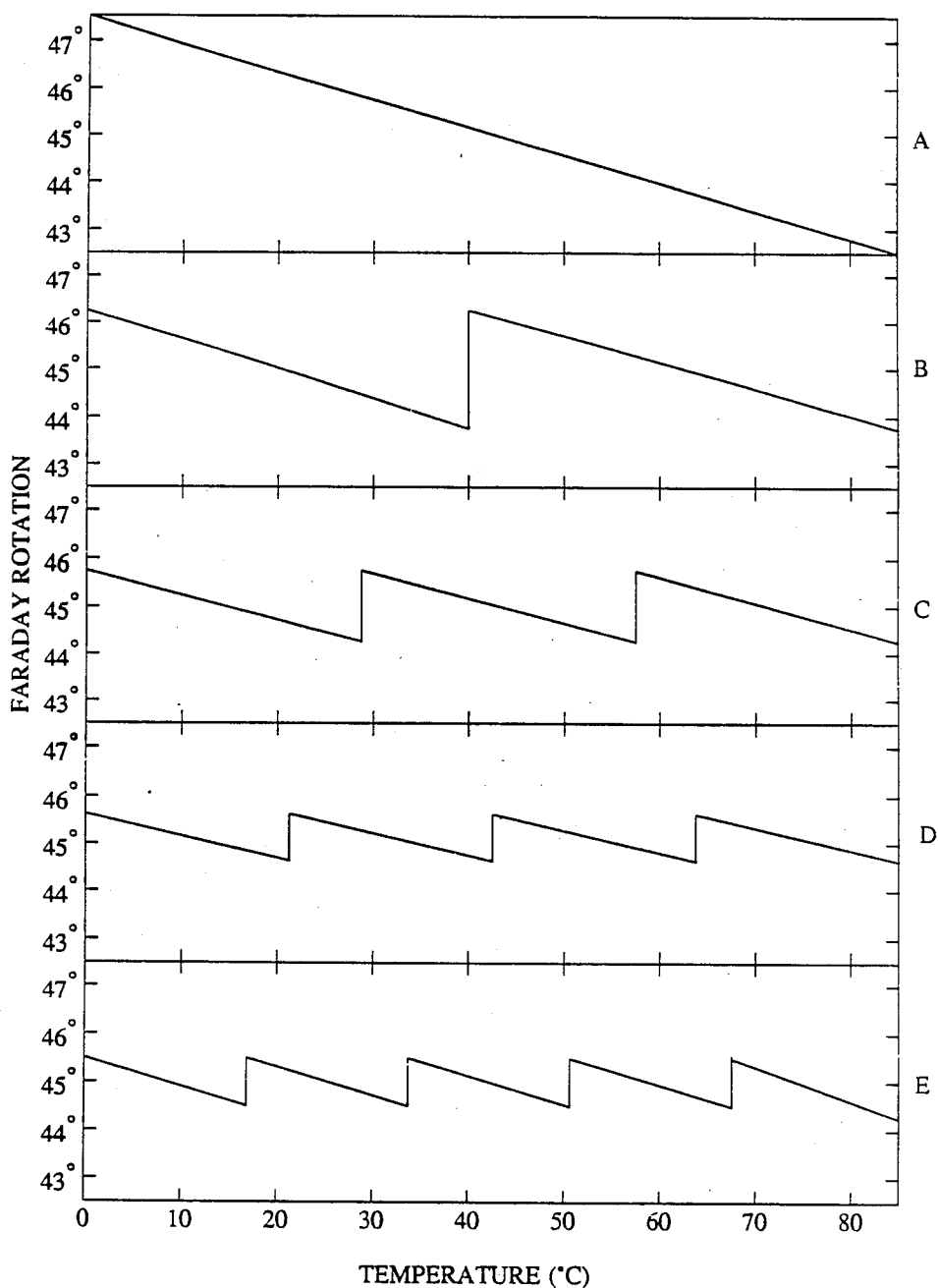
FIGS. 4a-4e schematically demonstrate the effect of a plurality of compensation point layers.

FIG. 3 schematically illustrates the principle of the invention. Curve 30 is the Faraday rotation of a layer of first material, exemplarily a Bi-based iron garnet of the type referred to in the discussion of FIG. 2. Exemplarily the thickness of the layer is adjusted such that the Faraday rotation is 45° at about 22° C. Curve 31 is the Faraday rotation due to a relatively thin layer of a second garnet material whose composition is selected such that the compensation temperature of the material falls within the operating temperature range of the isolator, exemplarily also at the midpoint of the temperature range. As can be seen from Curve 31, the Faraday rotation due to the compensation point layer is finite both below and above the compensation point but changes sign at that temperature. Those skilled in the art will realize that both curves 30 and 31 are somewhat idealized. For instance, the curve of Faraday rotation of the first layer typically is not truly linear but has a small non-linear component.

Curve 32 is the total Faraday rotation of a composite member comprising the thickness of first material and the compensation point layer. As is immediately obvious, the maximum departure from the ideal Faraday rotation value of 45° of Curve 32 is less than that of Curve 30, and consequently a Faraday rotator using the composite member according to the invention would have an ER whose minimum value in the operating temperature range is larger than that of a comparison device that does not use the compensation point layer.

FIGS. 4a through 4e schematically illustrate another aspect of the invention, namely, the effect of utilizing a multiplicity of compensation point layers. By appropriate choice of compositions, it is possible to further reduce the maximum departure of the Faraday rotation from the ideal value of 45°, compared to an isolator that uses a single compensation point layer. Whereas the single compensation point layer results in a maximum departure of about 1.3° (see FIG. 4b), it is only about 0.5° if four compensation point layers are used (see FIG. 4e). It will be understood that this comparison is exemplary only, pertains to an idealized situation involving particular choices of compensation temperatures, and is intended only as an aid to the understanding of the invention.

Tables I and and II further illustrate the principles of the invention, by showing how the maximum excursion in $\theta$ decreases with an increasing number of compensation point layers. The Tables show, inter alia, that the choice of optimization temperature may affect the maximum excursion in $\theta$ for a particular number of compensation point layers. This is particularly noticeable for the case of two compensation point layers, where a maximum $\theta$ of 1.32° results for the case of optimization at 22° C., whereas the maximum $\theta$ is only 0.85° for the case that is not optimized at that temperature.

TABLE I

| | Not Optimized at 22 ° C. | | |
|---|---|---|---|
| No. Layers | Comp. Temps. (°C.) | Max $\theta$ | $\theta$ @ 22° C. |
| 0 | | 2.55° | 1.23° |
| 1 | 42.5 | 1.28° | 0.05° |
| 2 | 28.3,56.7 | 0.85° | 0.47° |
| 3 | 21.2,42.5,63.8 | 0.64° | 0.60° |
| 4 | 17,34,51,68 | 0.51° | 0.21° |

TABLE II

| | Optimized at 22° C. | |
|---|---|---|
| No. Layers | Compensation Rotation and Temperature | Maximum $\theta$ and Temperature |
| 0 | | 3.78° @ 85° C. |
| 1 | 1.26° @ 43° C. | 1.32° @ 0° C. |
| 2 | 0.76° @ 34.6,59.8° C. | 1.32° @ 0° C. |
| 2 | 0.44° @ 14.7° C., 1.26° @ 43° C. | 1.26° @ 43,85° C. |
| 3 | 0.44° @ 14.7° C., 0.76° @ 34.6, 59.8° C. | 0.76° @ 34.6,59.8,85° C. |
| 4 | 0.44° @ 14.7° C.,0.54° @ 31,49, 67° C. | 0.54° @ 31,49,67,85° C. |

To achieve the required relatively high compensation temperature a composition comprising a substantial quantity of a high magnetic moment, compensation point atomic species such as Tb or Gd is advantageously used. The presence of a substantial quantity of Bi lowers the compensation temperature, therefore it is desirable to further incorporate Ga,Al, or both into the composition. See, for instance, W. H. von Aulock, editor, *Handbook of Microwave Ferrite Materials*, 1965, especially pages 167-194, which gives data that is useful in estimating a composition with the desired properties. Furthermore, the composition must relatively closely match the lattice parameter of the substrate. Incorporation of a fairly large Bi content is desirable so as to maintain a reasonably high specific rotation and limit the required thickness of the compensation point layer or layers.

Although the invention is not so limited, the discussion below will generally be in terms of an embodiment that comprises a magneto-optic member comprising a substrate and one or more first material layers and one or more compensation point layers on each of the two major surfaces of the substrate, the layers being epitaxial with the substrate.

Two exemplary compositions that can usefully be employed in conjunction with CMZ:GGG substrates are $(Bi_{0.8}Gd_{2.2})(Fe_{4.6}Ga_{0.2}Al_{0.2})O_{12}$ and $(Bi_{0.8}Gd_{1.1}Tb_{1.1})(Fe_{4.6}Ga_{0.4})O_{12}$. Both of these compositions have $T'_{comp}$ within the 0°–85° C. range. These compositions have specific rotations of about 70°–80°/mm at 1.31 μm wavelength. Thus, about 18 μm of material (9 μm per side) typically is required to obtain a desired rotation of 1.3°. Exemplarily, the first material layer advantageously is grown somewhat thicker (e.g., additional 5 μm per side) than is required to give 45° rotation, to compensate for the subtraction due to the use of the exemplary compensation point layer. Since in an exemplary device according to the invention the total first layer thickness for 1.31 μm devices is about 360 micron, the total additional thickness of magneto-optic garnet material in the device according to the invention is only about 8% of that total.

The currently preferred method of manufacture of magneto-optic members according to the invention involves liquid phase epitaxy (LPE). This technique for the growth of garnet layers is well known and does not require detailed discussion. In many cases it is advantageous to grow the compensation point layer directly on the substrate, followed by growth of a predetermined thickness of first material over it. However, a different layer sequence may be more advantageous under some circumstances, and all possible sequences are comtemplated. The compensation point layer can have uniform composition, can comprise two or more sublayers of different composition, or can have a continuously graded composition. Furthermore, there can be more than one compensation point layer.

Since it is typically necessary to transfer the sample from one melt into another melt, it has been found advantageous to use a sample holder which minimizes the contact between the sample holder and the wafer. Frequently it is also advantageous to mechanically or chemically polish the surface of the compensation point layer prior to the growth of first material thereon. This not only yields good surface quality but can also be used to fine-tune the layer thickness to yield the desired rotation.

Optionally, magneto-optic members according to the invention can comprise stress-relieving layers as described in a concurrently filed U.S. patent application Ser. No. 07/380,580, entitled "Apparatus Comprising a Magneto-Optic Isolator Utilizing a Garnet Layer" filed in the name of S. J. Licht, co-assigned with this and incorporated herein by reference. Exemplary first layer compositions are also disclosed in that patent application. These compositions are $(Bi_xB_{3-x})(Fe_{5-z}C_z)O_{12}$, wherein B is one or more rare earth element or elements (atomic number 57–71), C is Ga, Al, or a combination thereof, $1 \leq x \leq 2.5$, $0 \leq z \leq 1$. In some currently preferred embodiments the first layer material has composition $(Bi_xTb_yRE_{3-x-y})(Fe_{5-z}Ga_z)O_{12}$, where optional RE is one or more rare earths other than Tb, $0 < y \leq 2$, and $x+y \leq 3$. It will be appreciated however that the invention is not limited to the use of any particular first garnet material and/or compensation point garnet material.

Figure 5:
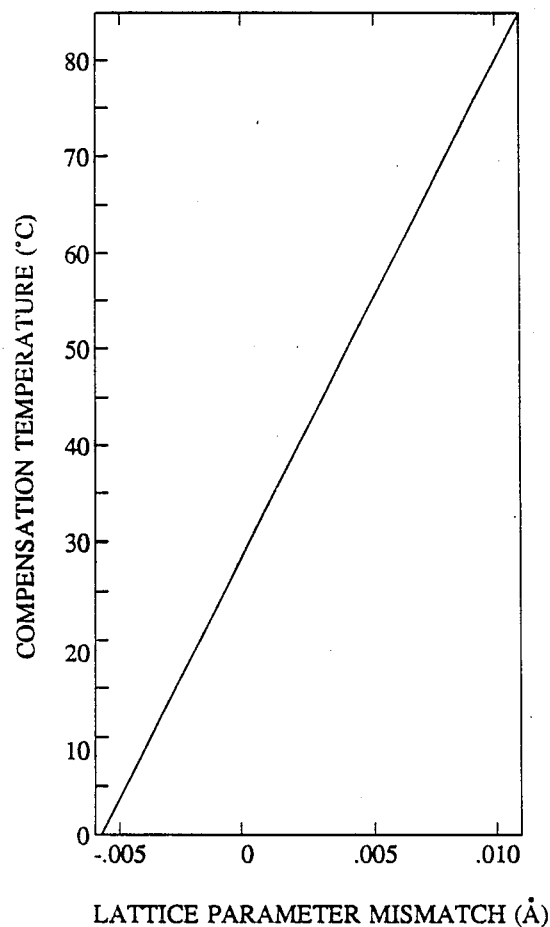
FIG. 5 shows exemplary data on compensation temperature versus lattice parameter mismatch, for an exemplary compensation point layer of nominal composition $(Bi_{0.8}Gd_{1.1}Tb_{1.1})(Fe_{4.6}Ga_{0.4})O_{12}$.

The composition of the compensation point layer can be varied continuously, inter alia, by varying the melt temperature during growth. However, as FIG. 5 exemplifies, a change in composition typically results in a change of lattice parameter, and this frequently limits the amount of compositional variation that can be achieved in any given melt. For instance, in the above recited compensation point compositions it is typically possible to accommodate a lattice parameter variation of about 0.0005 Å. This can provide a compensation point variation of about 25° C. Exemplarily, this variation in composition can result if the melt temperature is lowered by 7° C. over the course of a (typical) half hour growth run of the compensation point layer. Other film and melt compositions may allow even larger variations.

Figure 6:
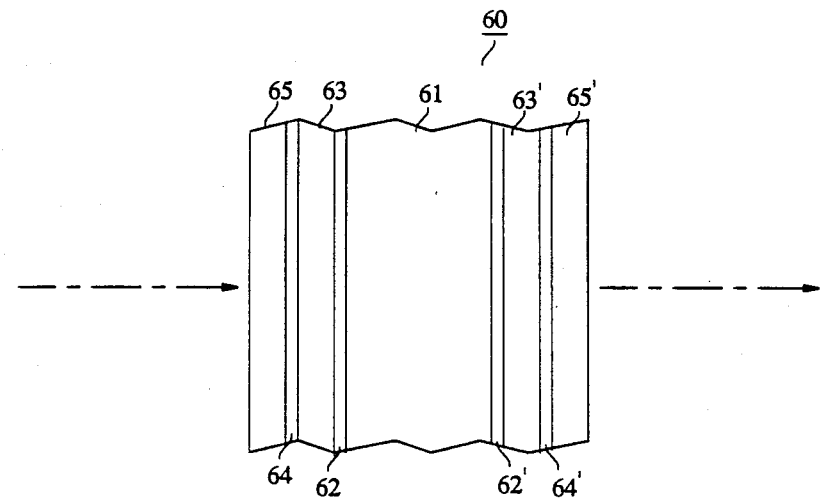
FIG. 6 shows schematically an assembly comprising a magneto-optic member according to the invention.

FIG. 6 schematically depicts an exemplary assembly 60 comprising a substrate 61, epitaxial therewith compensation point layers 62 and 62', and epitaxial therewith first layers 63 and 63'. The assembly further comprises polarization means (65 and 65') that are attached to the garnet member by index matching adhesive means (64 and 64'). Antireflection coatings typically are used on both the magneto-optic member and the polarizing means. Such coatings are well known to those skilled in the art and are not shown. Polarization means and index matching adhesive means useful in the practice of the invention are known. Exemplary polarization means are rutile wedges, or commercially available polarizing glass. Exemplary index matching adhesive means are commercially available IR-transparent, index matched epoxy.

As those skilled in the art know, the polarizing means 65' are typically oriented at 45° with respect to 65, and the magneto-optic member is designed to rotate the plane of polarization of radiation of the design wavelength (e.g., about 1.31 μm) by 45°. In this case essentially all of the radiation that has passed through the polarizer 65 will also pass through 65'. Furthermore, all the reflected radiation that has passed through 65' will be polarized at 90° to the orientation of 65 and will be blocked.

The presence of a compensation point layer in a magneto-optic isolator can be detected by a variety of techniques, including examination of the temperature variation of the Faraday rotation (the presence of a sawtooth or rounded sawtooth temperature variation is associated with an inventive isolator); magnetic examination (saturation magnetization and/or g-factor), and physical examination (optionally using selective etching techniques).

Figure 7:
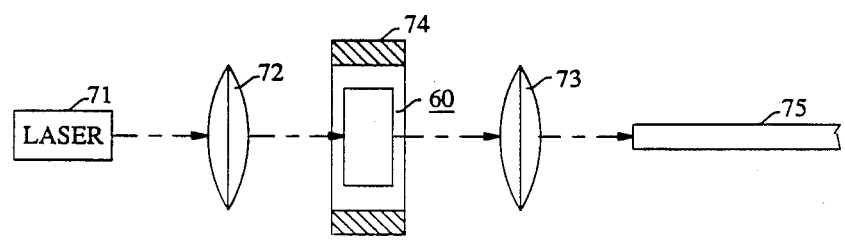
FIG. 7 schematically depicts exemplary apparatus according to the invention.

FIG. 7 shows schematically exemplary apparatus 70 according to the invention. The apparatus comprises a radiation source 71, typically a semiconductor laser or LED whose output can be modulated by appropriate means (not shown) in accordance with an external signal. Optional focusing means 72 direct the emitted radiation onto assembly 60 of the type shown in FIG. 6. Radiation transmitted through 60 is directed by optional focusing means 73 onto optical fiber 75. Toroidal permanent magnet 74 provides a magnetic field of strength sufficient to cause magnetic saturation of the garnet layers in assembly 60. Focusing means useful in apparatus according to the invention are known and include spherical lenses and GRIN rods. As will be appreciated by those skilled in the art, the inventive isolator means can be incorporated into a laser or LED package or can be provided in the form of a separate in-line device.

EXAMPLE

In a Pt crucible, appropriate amounts of $Bi_2O_3$, $Gd_2O_3$, $Fe_2O_3$, $Ga_2O_3$, $B_2O_3$ and PbO were melted. The melt composition was adapted to yield, under the growth conditions shown below, a compensation point layer material of composition $(Bi_{0.8}Tb_{1.1}Gd_{1.1})(Fe_{4.6}Ga_{0.4})O_{12}$. The saturation temperature of the melt was about 815° C. A 2 inch diameter (111) oriented CMZ:GGG wafer was prepared substantially as described in the above referred-to U.S. patent application, the melt was brought to 790° C., and the wafer was immersed horizontally in the melt. The wafer was rotated at 60 rpm, with reversal of the rotation direction every cycle. These conditions resulted in epitaxial growth, at a rate of about 0.4 μm/minute, yielding a 12 μm film on each side of the wafer in 30 minutes. The wafer was removed from the melt, the excess flux spun off, the wafer cooled slowly to room temperature and cleaned in dilute nitric acid. A combination of mechanical and chemical polishing was used to remove surface blemishes and to adjust the film thicknesses to result in 1.3° Faraday rotation at 1.3 μm wavelength. The thus produced composite wafer was used as the substrate for the two-sided epitaxial growth of first layer material of composition $Bi_{1.2}Tb_{1.8}Ga_{0.4}Fe_{4.6}O_{12}$, grown substantially as described in the above referred-to patent application. The starting melt temperature was 799° C., the wafer was rotated as described above. Growth was continued until each first material layer was about 183 μm thick. After removal of the resulting composite wafer from the melt the wafer was treated substantially as described above, with the thickness of the first layer material adjusted to result in a total Faraday rotation of 45° at 22° C. Chips diced from the thus produced wafer were incorporated into a magneto-optic isolator and performed as intended, with minimum ER at 1.31 μm wavelength higher than that of a comparison isolator with a magneto-optic member that comprises 2-sided first layer material of total thickness about 360 μm (adjusted to yield 45° rotation at 22° C.), without compensation point layer.

We claim:

1. Apparatus comprising a source of electromagnetic radiation, radiation utilization means, and magneto-optic isolator means between the source and the utilization means, the isolator means comprising magnet means, polarizer means and a magneto-optic member, associated with the isolator means being an operating temperature range and an extinction ratio that is a function of temperature; characterized in that the magneto-optic member comprises a first single crystal magneto-optic garnet layer and a single crystal garnet compensation point layer, the composition of the first layer material selected such that the material does not have a compensation point in the operating temperature range, and the composition of the compensation point layer material selected such that the material has a compensation temperature $T'_{comp}$ that is within the operating temperature range, with $T'_{comp}$ selected such that the minimum value of the extinction ratio in the operating temperature range is larger than that of otherwise identical comparison isolator means that do not comprise the compensation point layer.

2. Apparatus of claim 1, wherein the first layer material has a compensation temperature $T_{comp}$ that is less than −20° C., and $T'_{comp}$ is in the range 0°–85° C.

3. Apparatus of claim 1, wherein the first layer material has composition $(Bi_xB_{3-x})(Fe_{5-z}C_z)O_{12}$, wherein B is one or more rare earth elements, C is selected from the group consisting of Ga, Al, and combinations thereof, $1 \leq x \leq 2.5$, and $0 \leq z \leq 1$; and wherein the compensation point layer material has composition $(A_{3-x}B'_x)(Fe_{5-y}C'_y)O_{12}$, where A is selected from the group consisting of Gd, Tb, Dy, Ho, Er, and combinations thereof, where optional B' is selected from the group consisting of Y, Bi, Pb, La, Nd, Sm, Eu, Tm, Yb, Lu, Ca, and combinations thereof, where C' is selected from the group consisting of Ga, Al, Ge, Si, and combinations thereof, and where $0 < x \leq 2$, and $0.1 \leq y \leq 1$.

4. Apparatus of claim 3, wherein A is selected from the group consisting of Gd, Tb, and combinations thereof, wherein B' is Bi, and wherein C' is selected from the group consisting of Ga, Al, and combinations thereof.

5. Apparatus of claim 1, wherein the magneto-optic member comprises a single crystal garnet substrate that is substantially transparent at one or more wavelengths in the range 0.8–1.6 μm.

6. Apparatus of claim 5, wherein the substrate is CMZ:GGG, wherein the first layer material has nominal composition $(Bi_xTb_yRE_{3-x-y})(Fe_{5-z}Ga_z)O_{12}$, where RE is one or more rare earths other than Tb, $0 < y \leq 2.0$ and $x + y \leq 3$, and wherein the compensation point layer material comprises material of nominal composition $(A_{3-x}Bi_x)(Fe_{5-y}C'_y)O_{12}$, where A is selected from the group consisting of Gd, Tb, and combinations thereof, C' is selected from the group consisting of Ga, Al, and combinations thereof, $0 < x \leq 2$, and $10.1 \leq y \leq 1$.

7. Apparatus of claim 1, wherein the magneto-optic member comprises a single crystal garnet substrate having a first and a second major surface, with at least one compensation point layer and at least one first layer on both the first and second surfaces.

8. Apparatus of claim 1, comprising a multiplicity of compensation point layers, with at least two compensation point layers differing from each other in composition and in compensation temperature.

9. Apparatus of claim 1, comprising a compensation point layer that comprises a region of continuously varying composition.

10. Apparatus of claim 1, wherein the source is a semiconductor radiation source, wherein the utilization means comprise an optical fiber, wherein associated with the magneto-optic member is a saturation magnetization and the magnet means comprise a permanent magnet of strength sufficient to cause the garnet layer to exhibit saturation magnetization, wherein the first layer is nominally of composition $(Bi_xTb_{3-x}) Fe_{5-z}Ga_zO_{12}$, with $1 \leq x \leq 2$, and $0 \leq z \leq 1$, and wherein the compensation point layer comprises material of nominal composition $(A_{3-x}Bi_x)(Fe_{5-y}C'_y)O_{12}$, with A and C' selected from the groups consisting of Gd, Tb and combinations thereof, and Ga, Al and combinations thereof, respectively, with $0 < x \leq 2$, and $0.1 \leq y \leq 1$.

11. Apparatus of claim 10, wherein the semiconductor radiation source is a laser or a light emitting diode (LED), and the radiation emitted by the source is in the approximate range 0.8 μm–1.6 μm.

* * * * *